(12) United States Patent
Lim et al.

(10) Patent No.: US 11,503,940 B2
(45) Date of Patent: Nov. 22, 2022

(54) COOKING APPLIANCE

(71) Applicant: LG Electronics Inc., Seoul (KR)

(72) Inventors: Hakjoo Lim, Seoul (KR); Jaekyung Yang, Seoul (KR); Soochan Lee, Seoul (KR); Yongsoo Lee, Seoul (KR)

(73) Assignee: LG Electronics Inc., Seoul (KR)

(*) Notice: Subject to any disclaimer, the term of this patent is extended or adjusted under 35 U.S.C. 154(b) by 163 days.

(21) Appl. No.: 16/614,320

(22) PCT Filed: May 16, 2018

(86) PCT No.: PCT/KR2018/005634
§ 371 (c)(1),
(2) Date: Nov. 15, 2019

(87) PCT Pub. No.: WO2018/212600
PCT Pub. Date: Nov. 22, 2018

(65) Prior Publication Data
US 2020/0146498 A1    May 14, 2020

(30) Foreign Application Priority Data

May 17, 2017   (KR) .................. 10-2017-0060996

(51) Int. Cl.
H05B 6/12       (2006.01)
A47J 27/04      (2006.01)
H05B 6/36       (2006.01)

(52) U.S. Cl.
CPC .............. A47J 27/04 (2013.01); H05B 6/12 (2013.01); H05B 6/36 (2013.01); A47J 2027/043 (2013.01)

(58) Field of Classification Search
CPC .. A47J 2027/043; A47J 27/04; A47J 27/0817; A47J 27/16; A47J 39/00;
(Continued)

(56) References Cited

U.S. PATENT DOCUMENTS 3,707,145 A * 12/1972 Anetsberger .......... F24C 15/322
                                                    126/21 A
3,745,290 A *  7/1973 Hamden, Jr. .......... A47J 27/002
                                                    219/621

(Continued)

FOREIGN PATENT DOCUMENTS

EP   1795800 A1   6/2007
EP   1905331 A1   4/2008

(Continued)

OTHER PUBLICATIONS

English Translation of KR20060132211A (Year: 2006).*

(Continued)

Primary Examiner — Jimmy Chou
Assistant Examiner — Tiffany T Tran
(74) Attorney, Agent, or Firm — Fish & Richardson P.C.

(57) ABSTRACT

A cooking appliance according to an embodiment of the present invention may comprise: a case in which a cooking chamber is formed; a door for opening or closing the front opening of the case; a steam generating device mounted to the outer surface of the case; and a steam supply tube for connecting the steam generating device to the cooking chamber, wherein the steam generating device includes: a housing fixed to the case; a drawer which can be pushed into and pulled out of the housing and is filled with water for steam generation; and an induction unit installed at the bottom of the housing so as to heat water filled in the drawer by using electromagnetic induction.

17 Claims, 15 Drawing Sheets

(58) Field of Classification Search
CPC ........ A47J 31/10; A47J 31/56; A47J 37/0704;
F24C 15/327; F24C 7/088; F24C 15/102;
F24C 15/105; F24C 15/106; F24C 7/083;
F24C 7/087; H05B 6/108; H05B 6/12;
H05B 6/36; H05B 6/6479; H05B 6/6488;
H05B 1/0266; H05B 2213/04; H05B
3/746; E05B 47/0009
USPC ............... 219/401, 398, 407, 492, 629, 630;
126/21 A, 369; 99/448, 468, 469, 476,
99/482, 483; 122/227; 392/405
See application file for complete search history.

(56) References Cited

U.S. PATENT DOCUMENTS

| | | | | |
|---|---|---|---|---|
| 3,815,942 | A * | 6/1974 | White | F24C 15/022 |
| | | | | 292/201 |
| 4,424,426 | A * | 1/1984 | Ishii | E05B 47/0002 |
| | | | | 200/61.61 |
| 2006/0108433 | A1* | 5/2006 | Fossati | F24C 15/327 |
| | | | | 236/44 C |
| 2006/0278630 | A1* | 12/2006 | Sung | F22B 1/281 |
| | | | | 219/401 |
| 2007/0114222 | A1* | 5/2007 | Shon | A21B 3/04 |
| | | | | 219/401 |
| 2008/0078243 | A1* | 4/2008 | Jeon | A47J 27/04 |
| | | | | 73/290 R |
| 2008/0193110 | A1* | 8/2008 | Rusche | F22B 1/284 |
| | | | | 392/337 |
| 2010/0011605 | A1 | 1/2010 | Kim et al. | |
| 2010/0054717 | A1* | 3/2010 | Lee | F24C 15/327 |
| | | | | 392/401 |
| 2011/0248020 | A1* | 10/2011 | Yuan | A47J 37/0676 |
| | | | | 219/618 |
| 2013/0187524 | A1* | 7/2013 | Chen | A47B 88/463 |
| | | | | 312/319.1 |
| 2014/0251158 | A1 | 9/2014 | Yang et al. | |
| 2015/0083110 | A1* | 3/2015 | Shibuya | F24C 15/327 |
| | | | | 126/369 |
| 2017/0042373 | A1* | 2/2017 | Alexander | A47J 36/2494 |
| 2019/0174920 | A1* | 6/2019 | Kobayashi | A47B 88/463 |

FOREIGN PATENT DOCUMENTS

| | | |
|---|---|---|
| EP | 2466214 A1 | 6/2012 |
| KR | 1020060127674 A | 12/2006 |
| KR | 1020060132211 | 12/2006 |
| KR | 1020100009045 | 1/2010 |
| KR | 1020100009855 | 1/2010 |
| KR | 1020100012726 | 2/2010 |
| KR | 1020140141075 | 12/2014 |
| KR | 1020160025171 | 3/2016 |

OTHER PUBLICATIONS

English Translation of KR20160025171A (Year: 2014).*
Extended European Search Report in EP Appln. No. 18802257.8, dated Dec. 21, 2020, 10 pages.
International Search Report in International Application No. PCT/KR2018/005634, dated Aug. 28, 2018, 4 pages.

* cited by examiner

COOKING APPLIANCE

CROSS-REFERENCE TO RELATED APPLICATIONS

This application is a National Stage application under 35 U.S.C. § 371 of International Application No. PCT/KR2018/005634, filed on May 16, 2018, which claims the benefit of Korean Patent Application No. 10-2017-0060996, filed on May 17, 2017. The disclosures of the prior applications are incorporated by reference in their entirety.

TECHNICAL FIELD

The present invention relates to a cooking appliance.

BACKGROUND ART

Generally, a cooking appliance is a household appliance for cooking food and includes an electric oven, a microwave, and the like.

In particular, an electric oven is a device which cooks by confining water vapor generated from food together with heat in the oven and then heating to high temperature.

Recently, many cooking appliances including a steam supply device for supplying steam into a cooking space, such as a steam oven, have been released. By supplying steam into the cooking space, various dishes including steamed dishes are possible.

As the related art, Korean Patent Publication No. 2010-0009855 (Jan. 29, 2010) discloses a cooking appliance equipped with a steam supply device. The cooking appliance disclosed in the related art includes a steam generating device, a water supply tank for supplying water to the steam generating device, and a heater fixedly mounted inside the steam generating device.

However, the cooking appliance with the steam supply device disclosed in the related art has the following disadvantages.

First, since the steam generating device and the water tank for supplying water to the steam generating device should be provided separately, there is a disadvantage that the volume of the cooking appliance is large.

Second, since the steam generating device and the water tank must be provided separately, there is a disadvantage that the degree of freedom of design inside the cooking appliance is not large.

Third, since the heater has a structure which is fixed inside the steam generating device, there is a disadvantage that the cleaning of the steam generating device is not easy. In other words, in the conventional steam generating device, since the heater is submerged in water, scales are formed around the heater or on the inner wall of the steam generating device.

However, descaling is substantially impossible because it is difficult to disassemble the heater or disassemble the steam generating device. As a result, there is a disadvantage that the thermal efficiency of the steam generating device is remarkably lowered because the accumulated scale cannot be removed as the service life of the cooking appliance becomes longer.

Fourth, according to the conventional structure in which the heater is mounted inside the steam generating device and the heater is submerged in water, when water level in the steam generating device is lowered and the heater is exposed over the water surface, there is a disadvantage that the heater is overheated and there is a high risk of fire.

DISCLOSURE

Technical Problem

The present invention is proposed to improve the above problems.

Technical Solution

In order to achieve the above object, a cooking appliance according an embodiment of the present disclosure may include a case forming a cooking chamber therein; a door opening or closing a front opening of the case; a steam generator mounted on an outer surface of the case; and a steam supply tube connecting the steam generator and the cooking chamber to each other, in which the steam generator includes a housing fixed to the case; a drawer withdrawably provided to the housing, the drawer being configured to be filled with water for steam generation; and an inductor installed at a bottom of the housing so as to heat the water filled in the drawer using electromagnetic induction.

The drawer forms a double case structure including an inner case and an outer case, and an air layer is formed between the inner case and the outer case.

The inner case is formed of metal material, and the outer case is formed of a plastic material.

The front portion of the outer case is composed of a gripping portion and an extension portion inclined to the rear side from the gripping portion and thus a gripping space is formed on the rear side of the gripping portion.

A water level sensing space is formed at a rear side of the outer case, and the water level sensing space is provided with a water level sensing means.

The water level sensing means includes a floater that lifts and lowers according to the water level in the water level sensing space, and a water level sensor that detects a position of the floater, and the water level sensor includes a Hall sensor that detects magnetic force.

The thermistor for sensing the surface temperature of the outer case is installed outside the bottom portion of the outer case.

According to a temperature value sensed by the thermistor, an engaging device for blocking the withdrawal of the outer case is installed, and the engaging device may include a solenoid valve.

An engaging hole into which the engaging device is inserted or an engaging rib to which the engaging device is engaged may be formed at the bottom of the outer case.

An engaging hook protrudes from a rear surface of the outer case, and a hook receiver on which the engaging hook is engaged, and a switch for pushing a rear surface of the outer case may be provided at a rear surface of the housing.

The switch may include a push-pull switch that exerts a reaction force that pushes the rear surface of the outer case.

A discharge port may be formed at the rear end of the injection hole cover, and a connection port may be formed at the rear end of the housing to selectively connect the discharge port.

The induction unit may include a spirally wound working coil, a coil bracket supporting the working coil, and a plurality of magnetic bodies mounted on the coil bracket.

Slide rails protrude and extend on each of the left side portion and the right side portion of the outer case, and guide jaws and guide ribs for guiding movement of the slide rails are formed on the left side portion and the right side portion of the housing, respectively.

Advantageous Effect

A cooking appliance according to an embodiment of the present invention having the above configuration has the following effects or advantages.

First, since the water tank and the steam generating container are made of a single body, there is an advantage that the space inside the cooking chamber is widened and the degree of freedom of design inside the cooking appliance is increased.

Second, since the steam generating container can be freely separated from the cooking appliance, and the heater is disposed outside the steam generating container, there is an advantage that the steam generating container can be easily cleaned and filled with water.

Third, since the steam generating container has a double structure including an inner case and an outer case, and an air layer is formed between the inner case and the outer case, there is an advantage of preventing the surface of the steam generating container from overheating.

Furthermore, in addition to the air layer, the outer case is formed of plastic material, so that the surface temperature of the steam generating container is kept at a low temperature, and as a result, there is an advantage of being less likely to be burned by the skin being in contact with the surface of the steam generating container in a state where the steam generating container is separated.

Fourth, if the thermistor is mounted on the induction unit for generating heat and the surface temperature of the steam generating container is high, the withdrawal of the steam generating container is automatically blocked by the engaging device.

Fifth, since the induction unit is applied as the heat generating device and since the steam generating container is separated from the cooking appliance and the steam generating operation is stopped, there is an effect that the overheating phenomenon of the steam generating container is fundamentally blocked.

Sixth, since the gripping groove is formed between the front surface of the steam generating container and the handle portion, there is an advantage that the gripping portion for gripping the steam generating container is kept at a low temperature to protect the user's hand from burns.

Seventh, since the water injection hole is formed on the upper surface of the steam generating container, there is an advantage that the water injection into the steam generating container is easily performed.

Eighth, the discharge port formed on the rear surface of the steam generating container can be selectively coupled to the connection port formed in the housing of the steam generating device, and the connection port is maintained in a state of being connected to the steam supply tube which is fixed inside the cooking appliance. Therefore, there is an advantage that the steam is easily discharged and at the same time the steam is prevented from being leaked.

Ninth, by the push-pull switch structure for pushing the rear surface of the steam generating container, there is an advantage that the steam generating container can be attached and detached only by pressing and releasing the front surface of the steam generating container.

Tenth, due to the hook structure connecting the rear surface of the steam generating container and the housing, there is an advantage that the phenomenon that the steam generating container is withdrawn out accidentally is prevented.

BEST MODE

Figure 1:
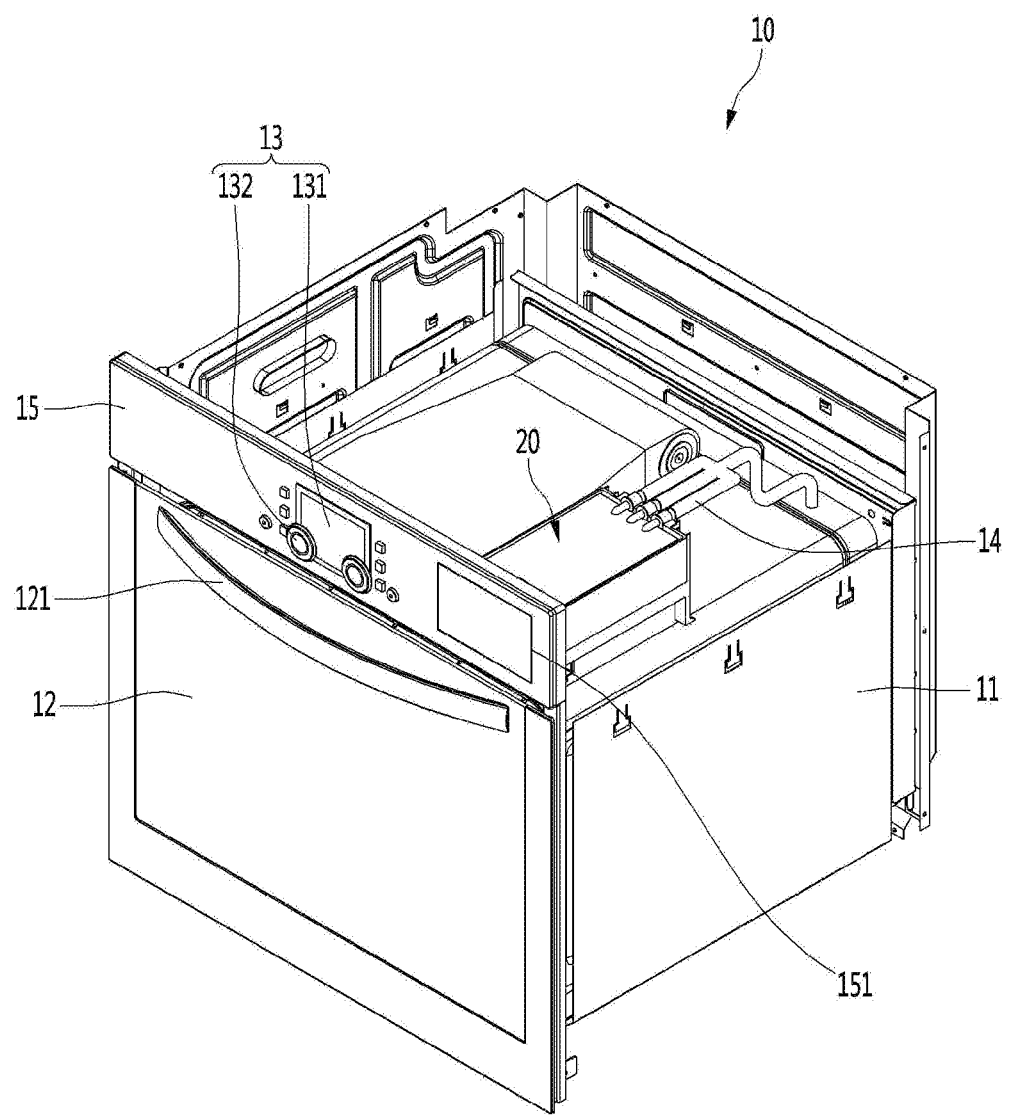
FIG. 1 is a perspective view illustrating a cooking appliance equipped with a steam generating device according to an embodiment of the present invention.

FIG. 1 is a perspective view illustrating a cooking appliance equipped with a steam generating device according to an embodiment of the present invention.

Referring to FIG. 1, a cooking appliance 10 according to an embodiment of the present invention may include a case 11 having a cooking chamber formed therein and having a front opening, a steam generating device 20 which is disposed at a left side or a right side of an upper surface of the case 11, a door 12 selectively opening or closing the opened front surface of the case 11, a decor panel 15 installed on the front surface of the case 11 corresponding to the upper side of the door 12, and a control panel 13 provided on the decor panel 15.

In addition, the front surface of the door 12 is provided with a door handle 121, and the door 12 may be rotatably coupled to a lower end of a front surface of the case 11 by a hinge.

In addition, the control panel 13 may include an operation unit 132 for inputting various commands, and a display unit 131 illustrating a command input by the operation unit 132 or an operation state of the cooking appliance 10.

In addition, a drawer insertion hole 151 is formed at an edge of the decor panel 15 corresponding to the position of the steam generating device 20 to be capable of perform withdrawal of the drawer (described later) constituting the steam generating device 20.

In addition, a steam supply tube 14 is connected to the rear surface of the steam generating device 20. The steam supply tube 14 is connected to the cooking chamber inside the case 11 so that steam generated by the steam generating device 20 is supplied into the cooking chamber.

Figure 2:
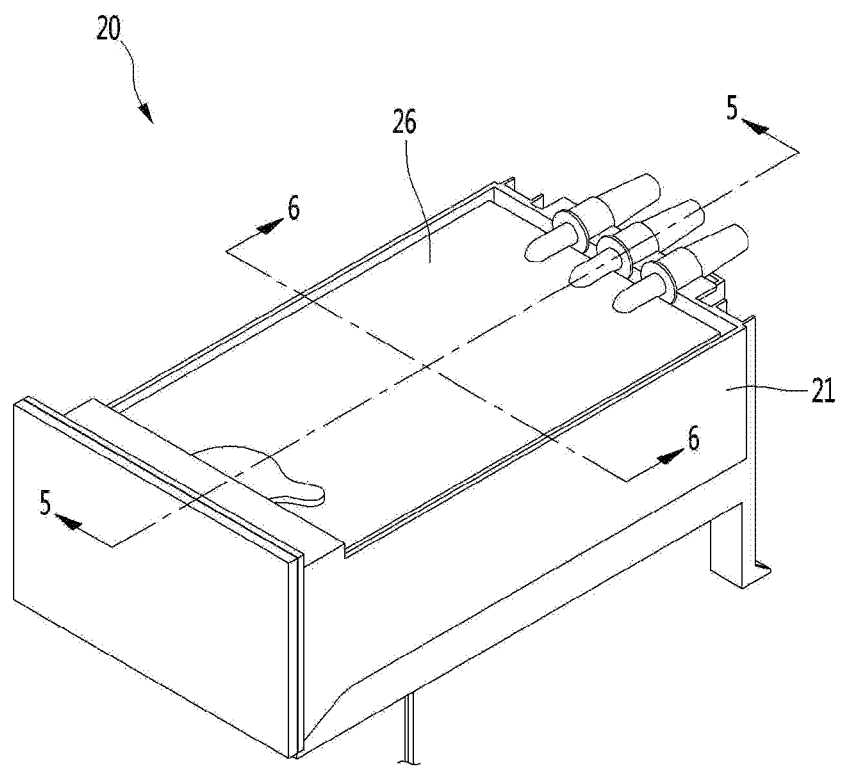
FIG. 2 is a front perspective view illustrating a steam generating device according to an embodiment of the present invention.
Figure 3:
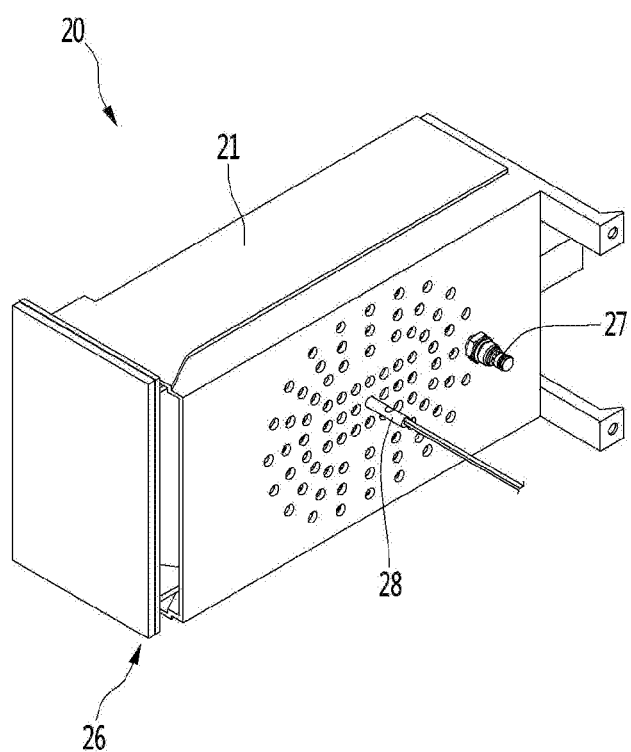
FIG. 3 is a bottom perspective view illustrating the steam generating device.
Figure 4:
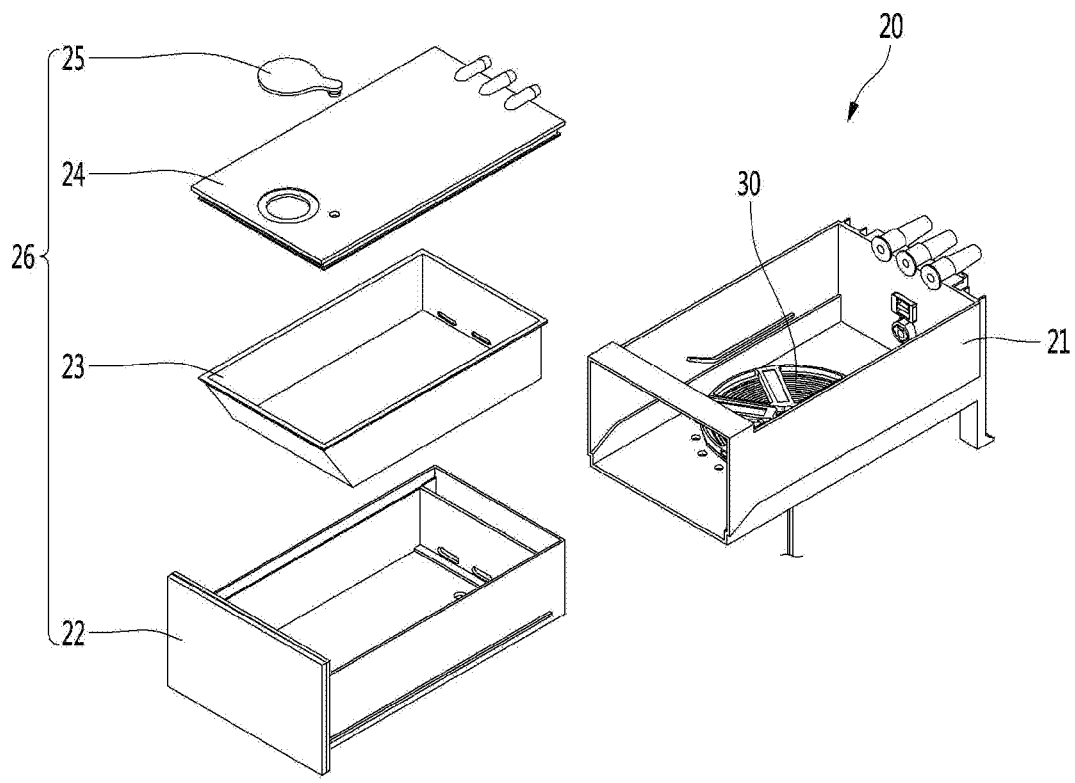
FIG. 4 is an exploded perspective view illustrating the steam generating device.
Figure 5:
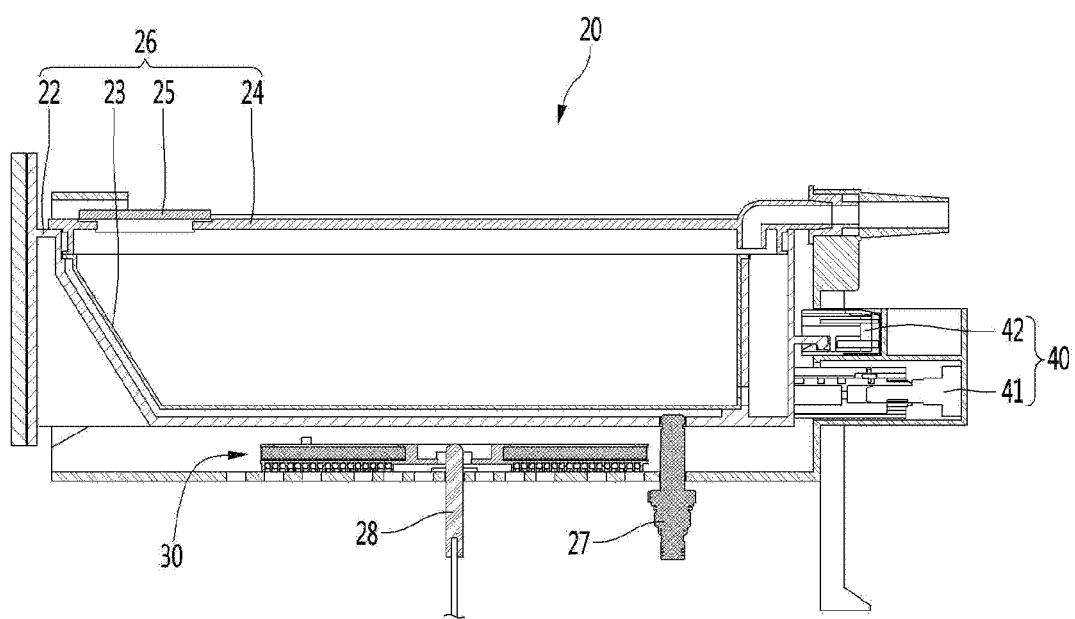
FIG. 5 is a longitudinal sectional view taken along line 5-5 of FIG. 2.
Figure 6:
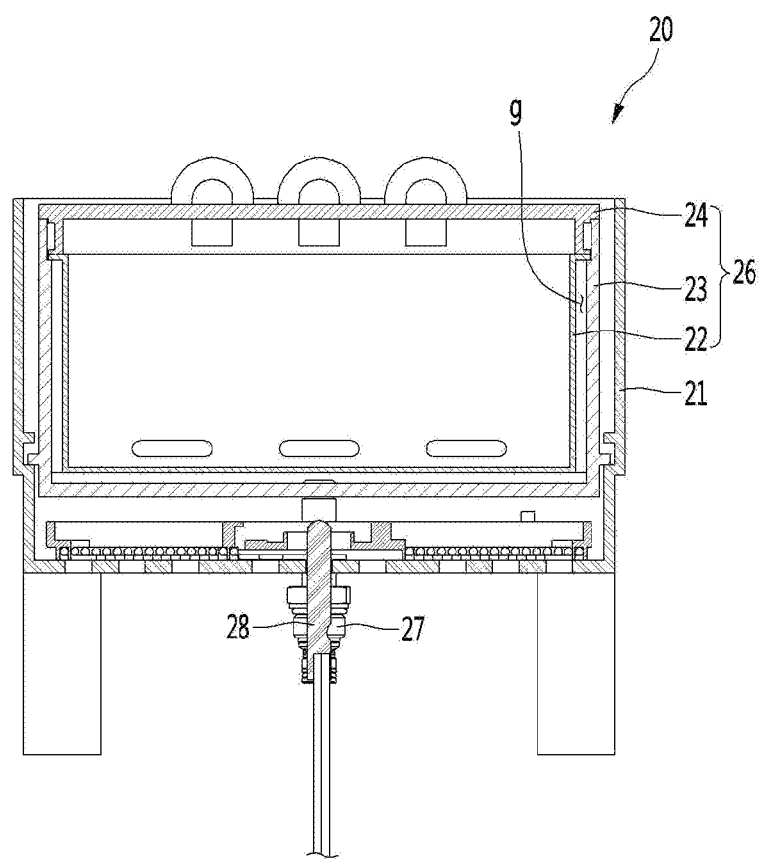
FIG. 6 is a longitudinal sectional view taken along line 6-6 of FIG. 2.

FIG. 2 is a front perspective view illustrating a steam generating device according to an embodiment of the present invention, FIG. 3 is a bottom perspective view illustrating the steam generating device, FIG. 4 is an exploded perspective view illustrating the steam generating device, FIG. 5 is a longitudinal sectional view taken along line 5-5 of FIG. 2, and FIG. 6 is a longitudinal sectional view taken along line 6-6 of FIG. 2.

Referring to FIGS. 2 to 6, the steam generating device 20 according to the embodiment of the present invention may include a housing 21 fixed to an upper surface of the case 11, a drawer slidingly inserted into the housing 21, an induction unit 30 fixedly mounted on the bottom of the housing 21 to generate heat, a switch unit 40 mounted on the rear surface of the housing 21 to selectively restrain the drawer 26, a thermistor 28 for detecting the temperature of the drawer 26, and an engaging device 27 for selectively limiting withdrawal of the drawer 26 based on a temperature value detected by the thermistor 28.

In detail, the thermistor 28 may be installed adjacent to the bottom portion of the drawer 26 through the bottom of the housing 21 and the center portion of the induction unit 30. In addition, the thermistor 28 detects the surface temperature of the drawer 26 and transmits the detected surface temperature to a control unit (not illustrated) of the cooking appliance 10 (which may be provided in the PCB substrate constituting the control panel 13). The control unit may limit the withdrawal of the drawer 26 by operating the engaging device 27 based on the received temperature value. Here, it should be noted that the mounting position of the thermistor 28 is not limited to the illustrated embodiment, but may be installed in other positions.

In addition, since the drawer 26 is detachable from the housing 21, the thermistor 28 may be installed outside the drawer 26 so as to sense a surface temperature value of the drawer 26.

In addition, the engaging device 27 may include a solenoid valve. In detail, the engaging device 27 is raised and lowered by an operation signal transmitted from the control unit. For example, when the temperature value of the drawer 26 transmitted to the control unit is high, the engaging device 27 may be raised to be inserted into a hole (to be described later) formed at the bottom of the drawer 26. Then, since the drawer 26 cannot be withdrawn, a phenomenon in which the user's body contacts the hot drawer surface and burns can be prevented in advance.

Since the engaging device 27 functions to limit the withdrawal of the drawer 26, it may be defined as a restraining member or a withdrawal limiting member. In addition, it should be noted that the engaging device 27 is not necessarily limited to the solenoid valve and a mechanical restraint member using a bimetal principle may be applied.

Meanwhile, the drawer 26 may include an outer case 22, an inner case 23 placed inside the outer case 22, a case cover 24 covering upper surfaces of the outer case 22 and the inner case 23, and an injection hole cover 25 for selectively opening or closing the injection hole 241a formed in the case cover 24.

A gap is formed between the inner case 23 and the outer case 22 to form an air layer g. The air layer g prevents heat transfer from the inner case 23 to the outer case 22 to prevent the outer case 22 from overheating.

In addition, the inner case 23 is formed of metal material having high heat conductivity, and is rapidly heated by electromagnetic induction generated in the induction unit 30. On the other hand, the outer case 22 is formed of non-metallic material having a relatively low heat conductivity, such as plastic, not only suppresses the temperature rise but is not heated by the induction unit 30. The inner case 23 may be formed of stainless steel, and the outer case 22 may be formed of polycarbonate.

Meanwhile, the switch unit 40 may include a switch 41, and a hook receiver 42 provided above the switch.

In detail, the switch 41 may include a push-pull type switch. Therefore, when the user presses and releases the front surface of the drawer 26, the switch 41 pushes the rear surface of the drawer 26, so that the front surface of the drawer 26 protrudes from a front surface of the decor panel 15 of the cooking appliance 10. Then, the user may remove the drawer 26 by pulling the gripping portion (to be described later) formed on the front of the drawer 26. Since the push-pull type switch is provided, there is an advantage that a handle for gripping the drawer does not need to be provided at the front surface of the drawer 26.

In addition, the hook receiver 42 is selectively engaged by the engaging hook 225a (see FIG. 14), which will be described later, to selectively limit the withdrawal of the drawer 26. In detail, when the user pushes the drawer 26 completely into the housing 21, the engaging hook 225a is engaged by the hook receiver 42. In this state, the drawer 26 is not accidentally or spontaneously withdrawn by an external force.

On the other hand, when the user presses and releases the front surface of the drawer 26, the switch 41 is operated to push the rear surface of the drawer 26 forward. Then, the engaging hook 225a is separated from the hook receiver 42 by the pushing force of the switch 41, so that the front surface of the drawer 26 protrudes from the front surface of the decor panel 15.

It should be noted that the switch 41 and the hook receiver are not limited to the illustrated embodiments and various means can be presented.

Figure 7:
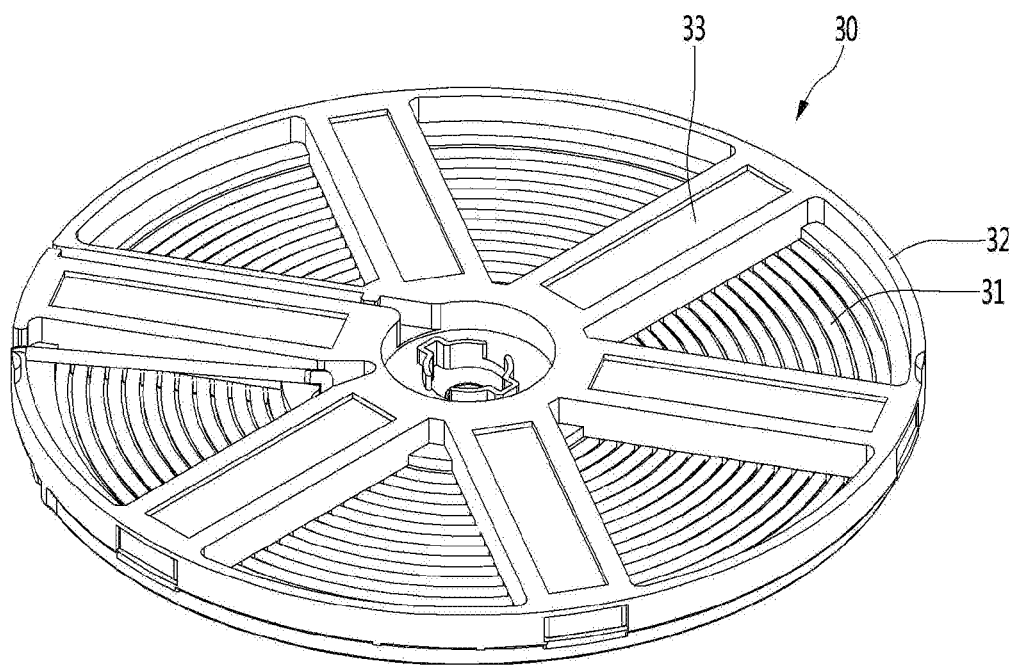
FIG. 7 is a perspective view illustrating an induction unit provided in the steam generating device according to the embodiment of the present invention.
Figure 8:
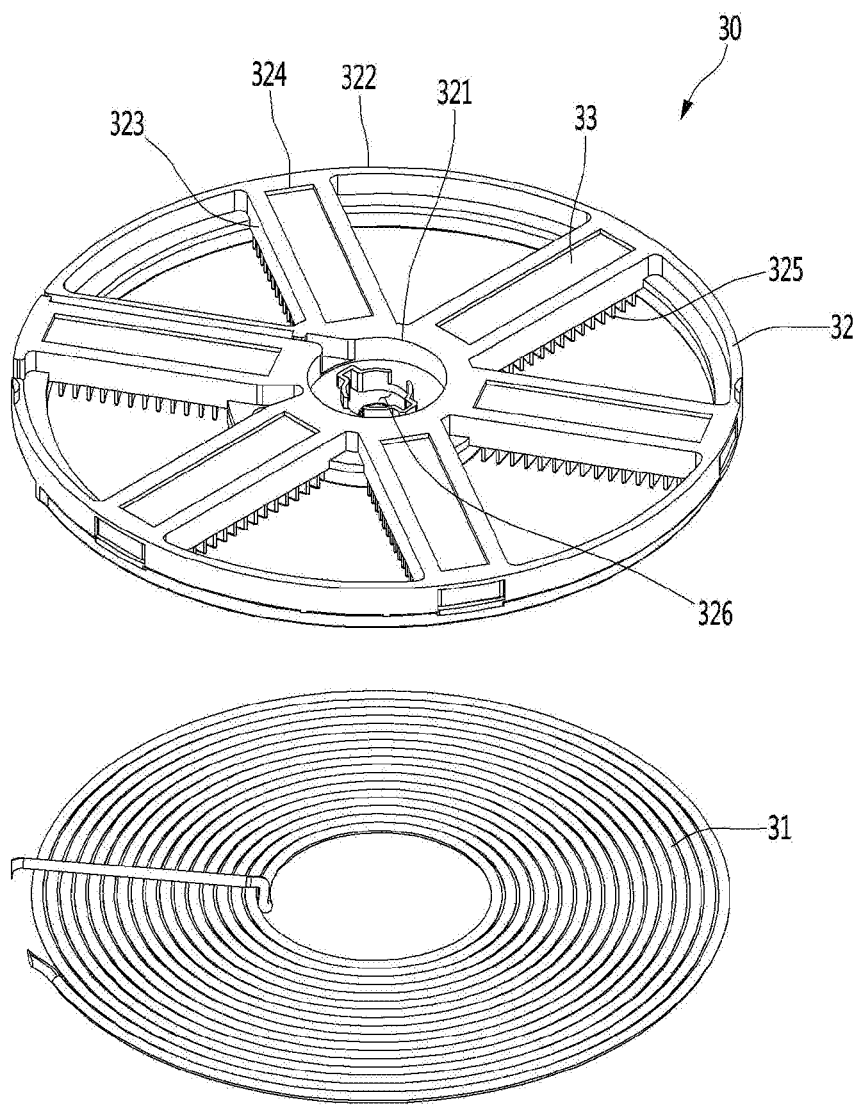
FIG. 8 is an exploded perspective view illustrating the induction unit viewed from above.
Figure 9:
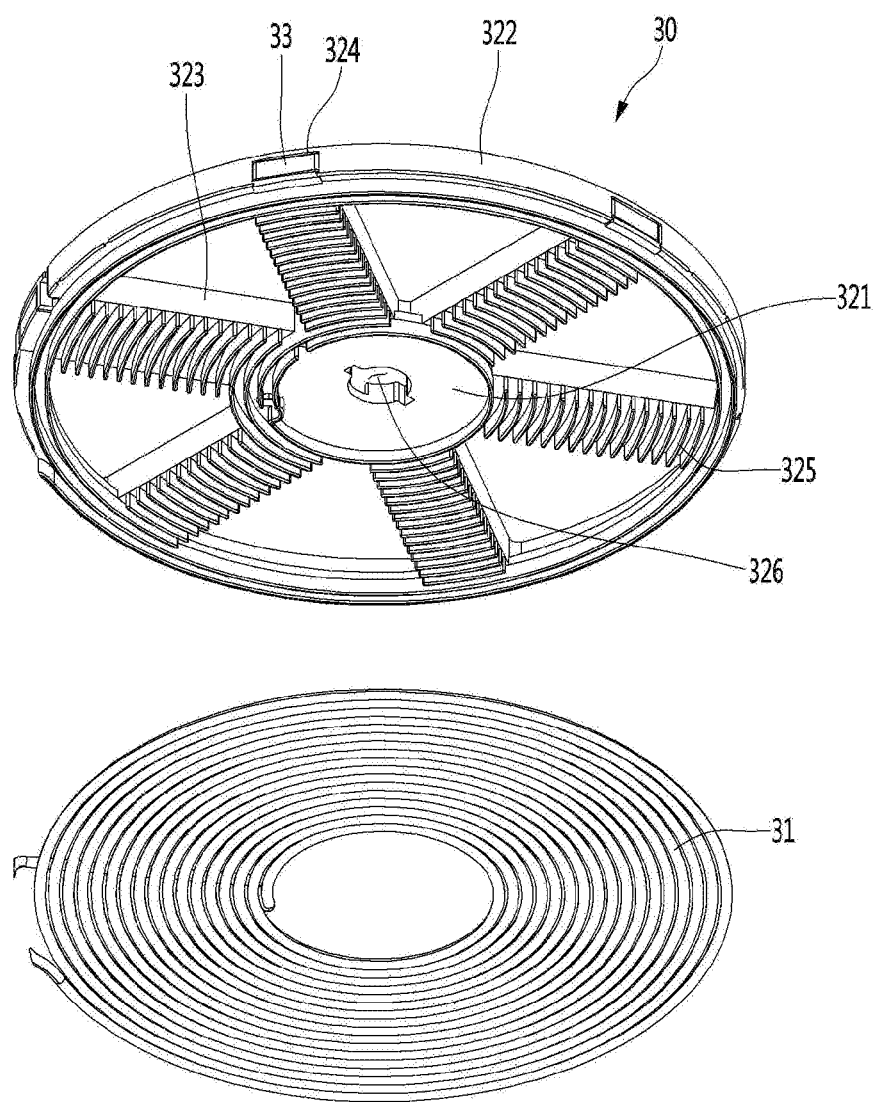
FIG. 9 is an exploded perspective view illustrating the induction unit viewed from below.

FIG. 7 is a perspective view illustrating an induction unit provided in the steam generating device according to the embodiment of the present invention, FIG. 8 is an exploded perspective view illustrating the induction unit viewed from above, and FIG. 9 is an exploded perspective view illustrating the induction unit viewed from below.

Referring to FIGS. 7 to 9, the induction unit 30 according to the embodiment of the present invention may include a working coil 31 wound spirally on a single plane, a coil bracket 32 supporting the working coil 31 in a state of being placed on the upper side of the working coil 31, and a magnetic body 33 disposed radially on the coil bracket 32.

In detail, the magnetic body 33 includes ferrite, and the ferrite causes the magnetic field generated from the working coil 31 to be diffused.

In addition, when an alternating current is applied to the working coil 31, the working coil 31 is provided with an alternating magnetic field whose direction changes with time. An alternating magnetic force is applied to the metal conductor placed above the working coil 31, and an eddy current is generated in the metal conductor by the electromagnetic induction phenomenon. The metal conductor is heated by Joule heat generated by the eddy current. Here, the metal conductor means the drawer 26, and specifically, the inner case 23.

Since only the inner case 23 formed of metal material is heated by the induction unit 30 that heats the metal container by using the electromagnetic induction principle, there is an effect of reducing the risk of burns due to heat at the time of withdrawal of drawer. In addition, since the induction heating by the induction unit 30 is not performed in a state where the drawer 26 is withdrawn, there is an advantage that the product stability is secured. Of course, when the withdrawal of the drawer 26 is detected, a control design may be made such that the power supply to the induction unit 30 is blocked.

Meanwhile, the working coil 31 is wound in a spiral shape on a single plane and is made of a form in which the radius gradually increases. The hollow portion is formed inside, and the outer diameter of the working coil 31 is determined by the number of times the coil is wound.

In addition, the coil bracket 32 may include an inner rim 321 placed at the central portion of the working coil 31, an outer rim 332 supporting an outer edge of the working coil 31, and a plurality of connection portions 323 extending radially to connect the inner rim 321 and the outer rim 322.

In detail, the plurality of connection portions 323 are spaced apart at regular intervals in the circumferential direction of the coil bracket 32. In addition, a magnetic body receiving groove 324 is recessed in an upper surface of each of the plurality of connection portions 323, and the magnetic body 33 is mounted in the magnetic body receiving groove 324.

In addition, a plurality of coil support ribs 325 protrude from the lower surface of each of the plurality of connection portions 323. The plurality of coil support ribs 325 are disposed to be spaced apart from the inner rim 321 in the direction of the outer rim 322 by a predetermined gap. In addition, the plurality of coil support ribs 325 are formed to be rounded with the same curvature as the curvature of the working coil 32. The gap between the coil support ribs 325 adjacent to each other in the radial direction is formed to have a length corresponding to the outer diameter of the coil constituting the working coil 31. Therefore, the working coil 31 is fitted into the space between the coil supporting ribs 325, and as a result, the spiral shape of the working coil 31 is not deformed.

In addition, the inner rim 321 covers a hollow portion formed inside the working coil 31. In addition, a center hole 326 through which the thermistor 28 penetrates may be formed at a central portion of the inner rim 321.

Figure 10:
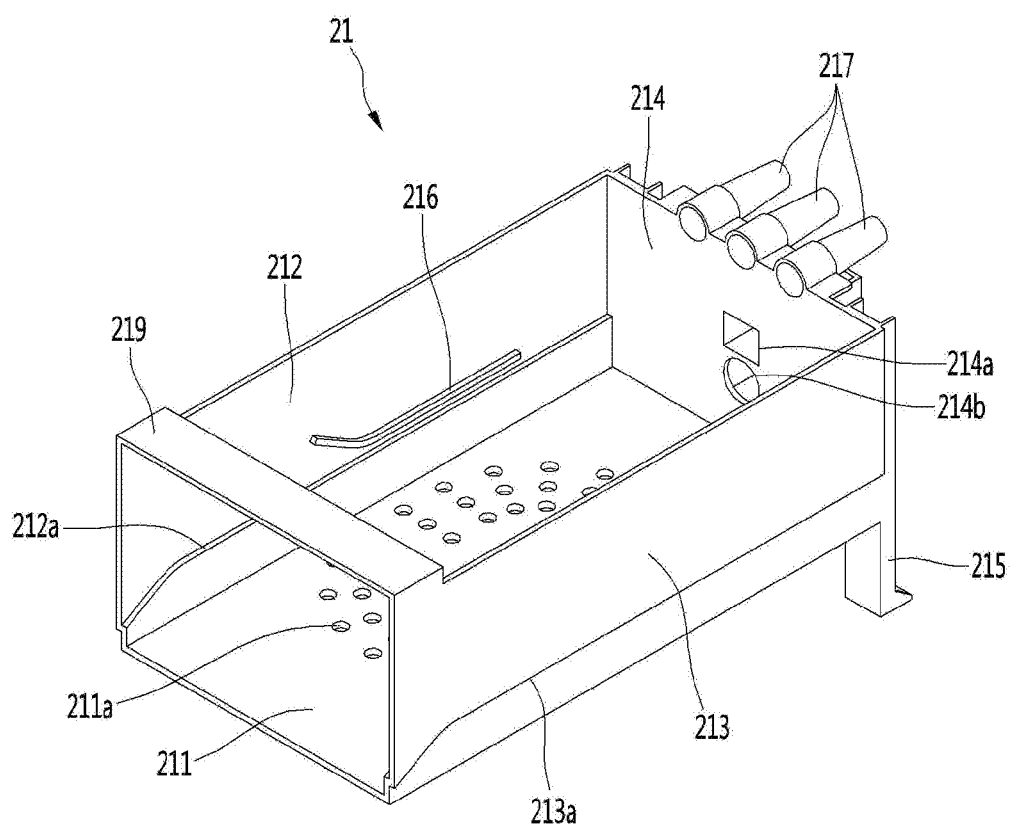
FIG. 10 is a front perspective view illustrating a housing constituting the steam generating device according to the embodiment of the present invention.
Figure 11:
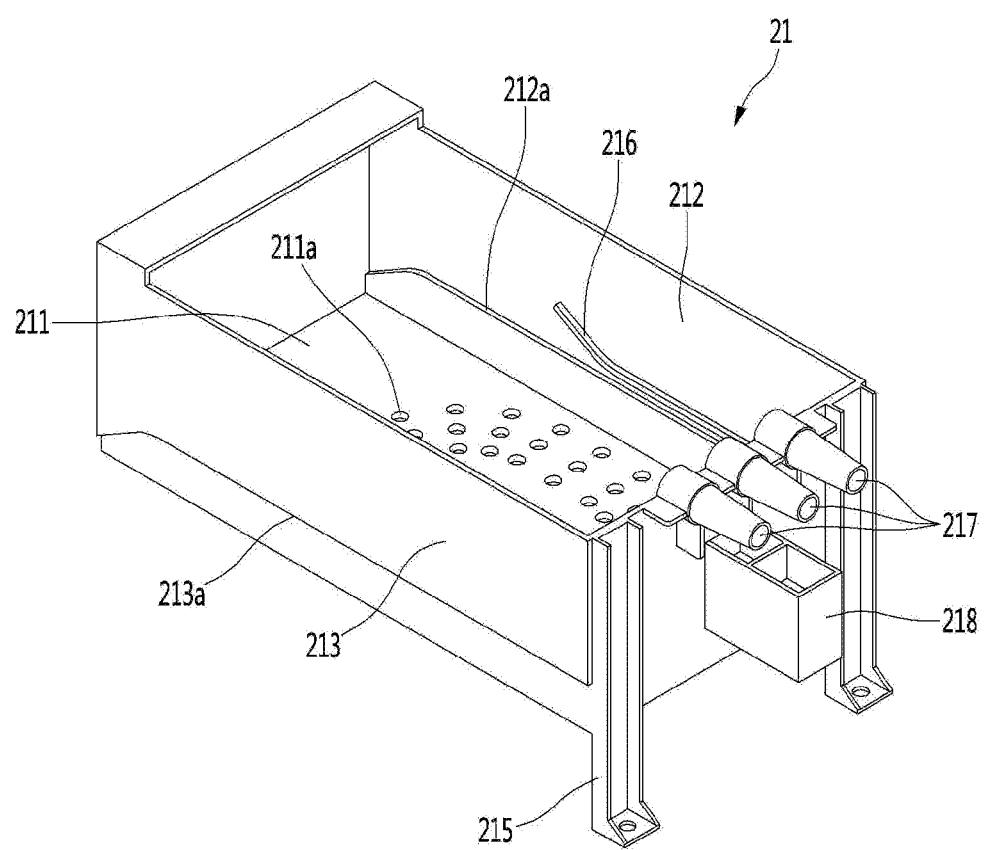
FIG. 11 is a rear perspective view illustrating the housing.
Figure 12:
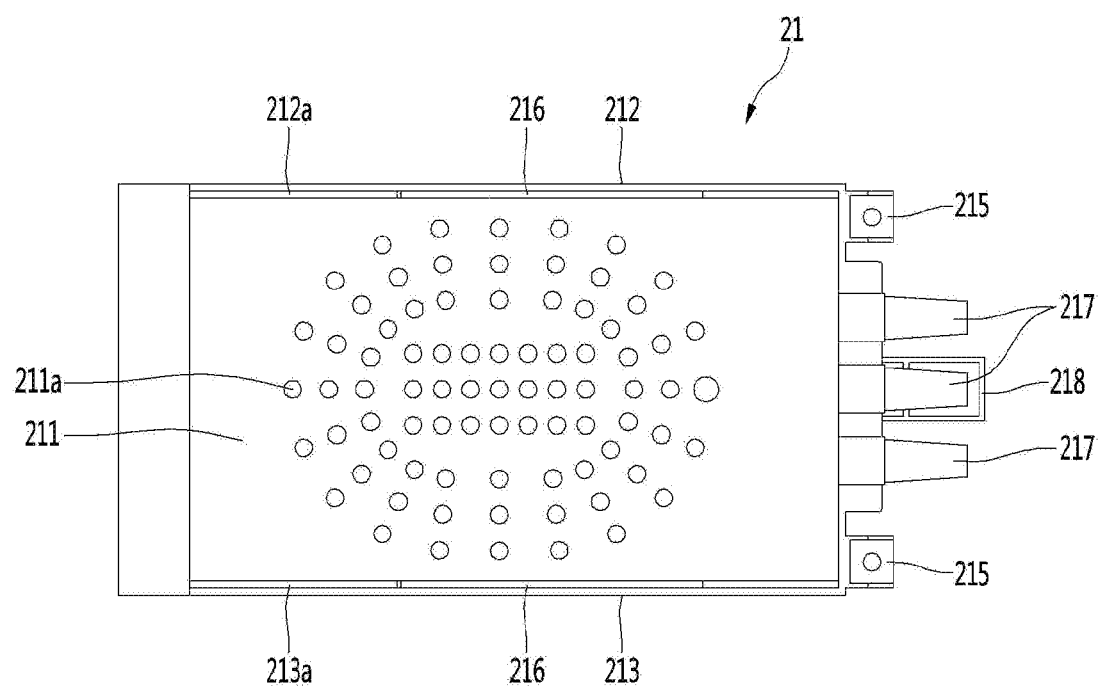
FIG. 12 is a plan view illustrating the housing.

FIG. 10 is a front perspective view illustrating a housing constituting the steam generating device according to the embodiment of the present invention, FIG. 11 is a rear perspective view illustrating the housing, and FIG. 12 is a plan view illustrating the housing.

Referring to FIGS. 10 to 12, the steam generating device 20 according to the embodiment of the present invention may include a drawer 26, and a housing 21 in which the drawer 26 is slidingly inserted.

In detail, the front surface of the housing 21 is opened for withdrawal of the drawer 26. In addition, an upper surface of the housing 21 may also be opened, but is not limited thereto.

The housing 21 includes a bottom portion 211, a left side portion 212 and a right side portion 213 extending upward from left and right edges of the bottom portion 211, and a rear portion 214 connecting rear ends of the bottom portion 211, the left side portion 212, and the right side portion 213.

In addition, a plurality of heat dissipation holes 211a may be formed in the bottom portion 211, and the induction unit 30 may be disposed on the upper side of the plurality of heat dissipation holes 211a. Therefore, the surface of the outer case 22 constituting the induction unit 30 and the drawer 26 can be cooled by external air flowing through the plurality of heat dissipation holes 211a while the steam generation is stopped.

In addition, the guide ribs 216 extend in the front and rear directions on the inner surfaces of the left side portion 212 and the right side portion 213, respectively. In addition, guide jaws 212a and 213a are formed to be stepped at any point of the left side portion 212 and the right side portion 213 corresponding to the lower side of the guide rib 216. Then, the slide rail 228 of the drawer 26 to be described later is inserted into the rail receiving space formed between the guide rib 216 and the guide jaw 212a.

In detail, a portion of the guide rib 216 may be inclined upward toward the front end portion of the housing 21 to allow the slide rail 228 to be inserted smoothly into the rail receiving space.

In addition, the guide jaw 212a and 213a may be formed by stepping a portion of the left side portion 212 and the right side portion 213 toward the center of the housing 21. The guide jaws 212a and 213a may be formed to have a length from the front end portion to the rear end portion of the left side portion 212 and the right side portion 213. The width (or stepped depth) of the guide jaws 212a and 213a may be formed to a size corresponding to the width of the guide rib 216 but is not limited thereto. In other words, a width sufficient to stably support the slide rails 228 is sufficient.

Meanwhile, a hook hole 214a and a switch hole 214b may be formed in the rear portion 214, and a switch case 218 may be extended in the rear surface of the rear portion 214.

In addition, one or more connection ports 217 may be formed to extend in the front and rear direction of the housing 21 at the upper end of the rear portion 214. The plurality of connection ports 217 may be formed to be spaced apart at regular gaps in the width direction of the housing 21.

In addition, the support leg 215 may extend downward from the bottom portion 211 of the housing 21, and the lower end portion of the support leg 215 can be fixed to an upper surface of the case 11 of the cooking appliance 10 by the fastening member.

In detail, the support leg 215 may extend at four corners of the bottom portion 211 of the housing 21, or may extend only at the left and right edges of the rear end portion of the bottom portion 211.

Meanwhile, an upper end of the front surface of the left side portion 212 and an upper end of the front surface of the right side portion 213 can be connected by a connecting rib 219 extending with a predetermined width. The opening of the front end portions of the left side portion 212 and the right side portion 213 may be prevented by the connecting rib 219. In addition, the connecting rib 219 may be formed at a point higher than the upper end portions of the left side portion 212 and the right side portion 213.

Figure 13:
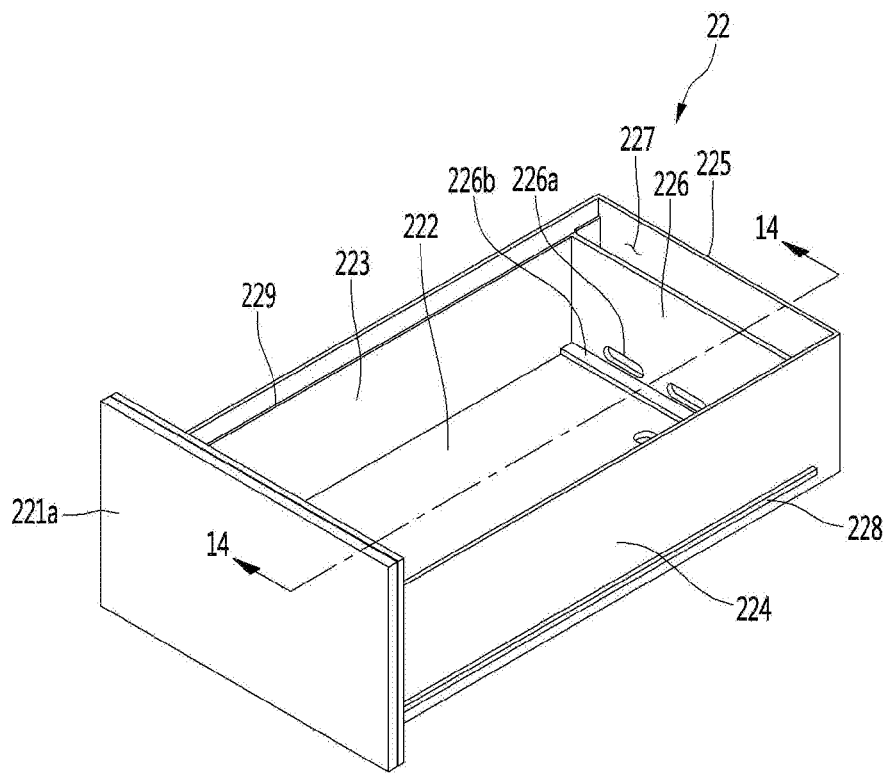
FIG. 13 is a perspective view illustrating the outer case constituting the drawer of the steam generating device according to an embodiment of the present invention.
Figure 14:
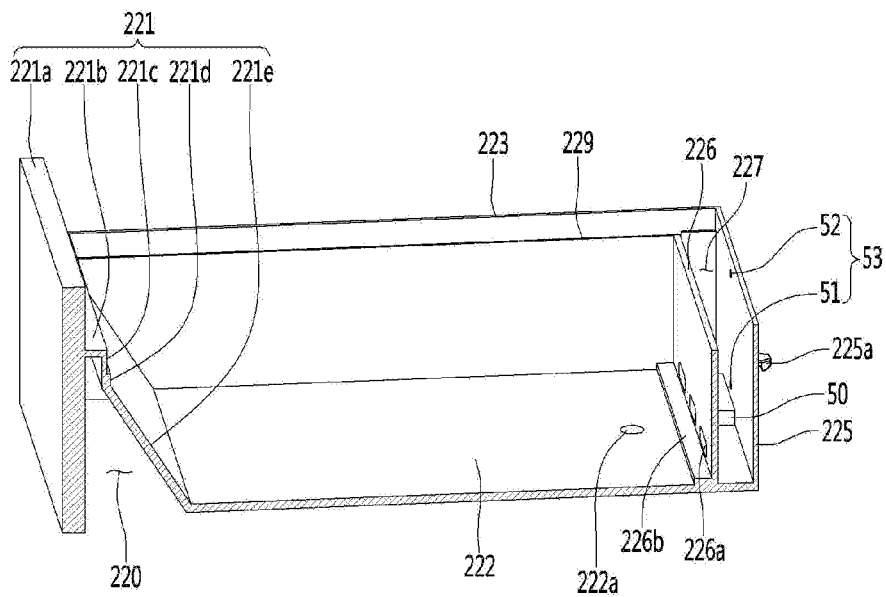
FIG. 14 is a cut-away perspective view taken along line 14-14 of FIG. 13.

FIG. 13 is a perspective view illustrating the outer case constituting the drawer of the steam generating device according to an embodiment of the present invention, and FIG. 14 is a cut-away perspective view taken along line 14-14 of FIG. 13.

Referring to FIGS. 13 and 14, the drawer 26 constituting the steam generating device 20 according to the embodiment of the present invention includes an outer case 22.

In detail, the outer case 22 includes a front portion 221, a left side portion 223 and a right side portion 224 extending vertically from the left and right ends of the front portion 221, a bottom portion 222 extending horizontally from the lower end of the front portion 221 to the rear side, and a rear portion 225 connecting the rear ends of the bottom portion 222, the left side portion 223, and the right side portion 224. The upper surface of the outer case 22 is opened.

In more detail, the front portion 221 may include a gripping portion 221a for gripping by a user by hand, a case cover seating portion 221b extending horizontally from a rear surface of the gripping portion 221a, a vertical portion 221c extending downward from the rear end of the case cover seating portion 221b, a front support jaw 221d protruding from the rear surface of the vertical portion 221c, and an inclined portion 221e extending obliquely from the lower end of the vertical portion 221c to the rear side.

The inclined portion 221e is formed to be inclined at a predetermined angle from the vertical surface, and a gripping groove 220 is formed between the gripping portion 221a and the inclined portion 221e. By the gripping groove 220 being formed, it is possible to minimize the temperature rise of the gripping portion 221a due to the heat transferred from the inner case 23.

The gripping portion 221a completely closes the drawer insertion hole 151 formed in the decor panel 15 of the cooking appliance 10 when the drawer 26 is completely inserted into the housing 21. In other words, the gripping portion 221a and the drawer insertion hole 151 have the same shape and size.

In addition, an engaging hole 222a is formed at one point of the bottom portion 222, and the engaging device 27 is selectively inserted into the engaging hole 222a. For example, when the surface temperature of the outer case 22 detected by the thermistor 28 is higher than or equal to a set temperature, when the engaging device 27 is raised and inserted into the engaging hole 222a, withdrawal of the drawer 26, including the outer case 22 becomes impossible.

On the other hand, when the surface temperature of the outer case 22 detected by the thermistor 28 is less than the set temperature, the engaging device 27 is in a state separated from the engaging hole 222a, and thus the drawer 26 can be withdrawn.

Here, in order to limit the withdrawal of the outer case 22 by the engaging device 27, various means may be proposed in addition to the method of forming a hole in the outer case 22.

For example, when an engaging rib protrudes from the bottom surface of the outer case 22, and the engaging device 27 is provided to be liftable in front of the engaging rib, the engaging device 27 is engaged by the engaging ribs and thus it will be possible to limit the withdrawal of the outer case 22.

Meanwhile, side support jaws 229 may be formed on inner surfaces of the left side portion 223 and the right side portion 224. The side support jaw 229 may be formed at a point spaced downward from an upper ends of the left side portion 223 and the right side portion 224, and may have a length extending from the front end to the rear end of the left side portion 223 and the right side portion 224. The side support jaw 229 may be formed at the same height as the front support jaw 221d.

In addition, on the outer surface of the left surface portion 223 and the right surface portion 224, the slide rail 228 is formed to extend by a predetermined length in the front and rear direction. The slide rail 228 protrudes horizontally from the outer surface of the left side portion 223 and the right side portion 224 with a predetermined width. The slide rail 228 may be formed at a point closer to the lower end than the upper end of the left side portion 223 and the right side portion 224. The slide rail 228 is slidably moved in a state where the slide rails 228 are seated on the guide jaws 212a and 213a formed on the left side portion 212 and the right side portion 213 of the housing 21.

In addition, an engaging hook 225a may protrude from a rear surface of the rear portion 225, and the engaging hook 225a is inserted into a hook hole 214a formed in the housing 21. In addition, the partition wall 226 may be extended at any point of the bottom portion 222 spaced forward from the rear portion 225.

In detail, an upper end of the partition wall 226 may extend to the side support jaw 229. In other words, upper ends of the side support jaw 229, the front support jaw 221d, and the partition wall 226 may have the same height.

In addition, one or a plurality of communication holes 226a are formed in the lower region of the partition wall 226 so that a portion of the water filled in the inner case 23 can flow into the space between the rear portion 225 and the partition wall 226. In addition, the space between the rear portion 225 and the partition wall 226 may be defined as a water level sensing space 227.

In addition, the rear portion 225 may be equipped with a water level detecting sensor 53, and a floater 50 may be received in the water level sensing space 227. Therefore, the position of the floater 50 rises as the water level of the water flowing through the communication hole 226a increases.

In addition, the water level sensor 53 may include a full water level sensor 52 and a low water level sensor 51, the full water level sensor 52 is formed at a point adjacent to an upper end portion of the rear portion 225 and the low water level sensor 51 may be formed at a point adjacent to the lower end portion of the back portion 225. By this structure, as the floater 50 rises, the water level sensor 53 can sense the water level of the water filled in the inner case 23. The water level sensor 53 may be a hall sensor that detects a magnetic field of a magnet.

In addition, a lower support jaw 226b may protrude from an edge portion where the partition wall 226 meets the bottom portion 222. The bottom portion of the inner case 23 and the bottom portion 222 of the outer case 22 are kept spaced apart by the height of the lower support jaw 226b. In addition, the rear surface of the bottom portion of the inner case 23 is in close contact with the lower support jaw 226b, such that water flowing into the water level sensing space 227 through the communication hole 226a can prevent from leaking into the spaced space between the bottom portion of the inner case 23 and the bottom portion 222 of the outer case 22.

Figure 15:
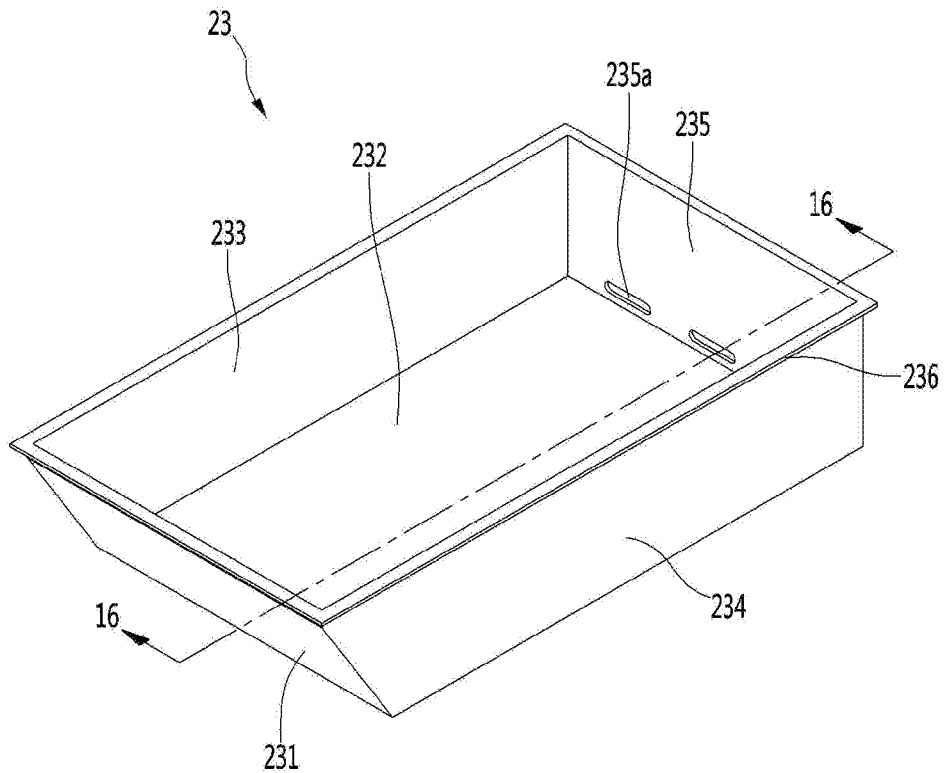
FIG. 15 is a perspective view illustrating an inner case constituting a drawer of the steam generating device according to the embodiment of the present invention.
Figure 16:
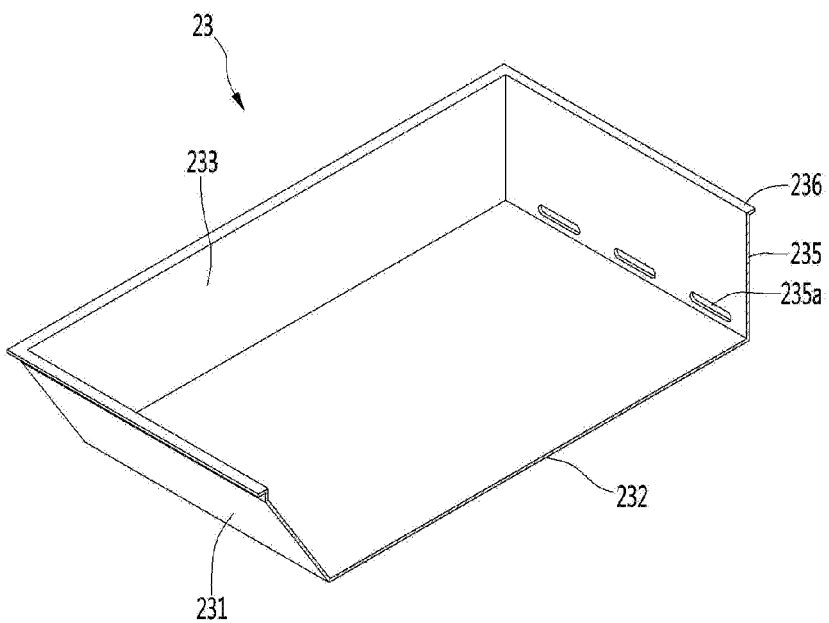
FIG. 16 is a cut-away perspective view taken along line 16-16 of FIG. 15.

FIG. 15 is a perspective view illustrating an inner case constituting a drawer of the steam generating device according to the embodiment of the present invention, and FIG. 16 is a cut-away perspective view taken along line 16-16 of FIG. 15.

Referring to FIGS. 15 and 16, the drawer 26 constituting the steam generating device 20 according to the embodiment of the present invention includes an inner case 23.

In detail, the inner case 22 includes an inclined front portion 231, a bottom portion 232 extending horizontally from a lower end of the front portion 231, a left side portion 233 and a right side portion 234 extending vertically from end portion of the front portion 231 in the left and right direction to the rear side, and a rear portion 235 connecting the bottom portion 232, the left side portion 233, and the right side portion 234.

The front portion 231 may be formed to be inclined at the same angle as the inclined portion 221e of the outer case 23. In other words, the front portion 231 and the inclined portion 221e may extend in parallel.

In addition, a flange 236 extends horizontally from an upper end of the front portion 231, the left side portion 233, the right side portion 234, and the rear portion 235. The flange 236 is seated on the front support jaw 221d of the outer case 22, the side support jaw 229, and the upper end of the partition wall 226.

In addition, one or a plurality of communication holes 235a are formed in an area adjacent to the lower end portion of the rear portion 235, and the communication holes 235a communicate with the communication holes 226a of the outer case 22. Therefore, a portion of the water stored in the inner case 23 passes through the communication holes 235a and 226a and moves to the water level sensing space 227.

Meanwhile, as illustrated in FIGS. 5 and 6, the inner case 23 is spaced apart from the outer case 22 by a predetermined gap by the flange 236. In addition, the space spaced is filled with air. However, the rear portion 235 of the inner case 23 is in close contact with the partition wall 226 of the outer case 22 and spaced apart from the rear portion 225 of the outer case 22.

Figure 17:
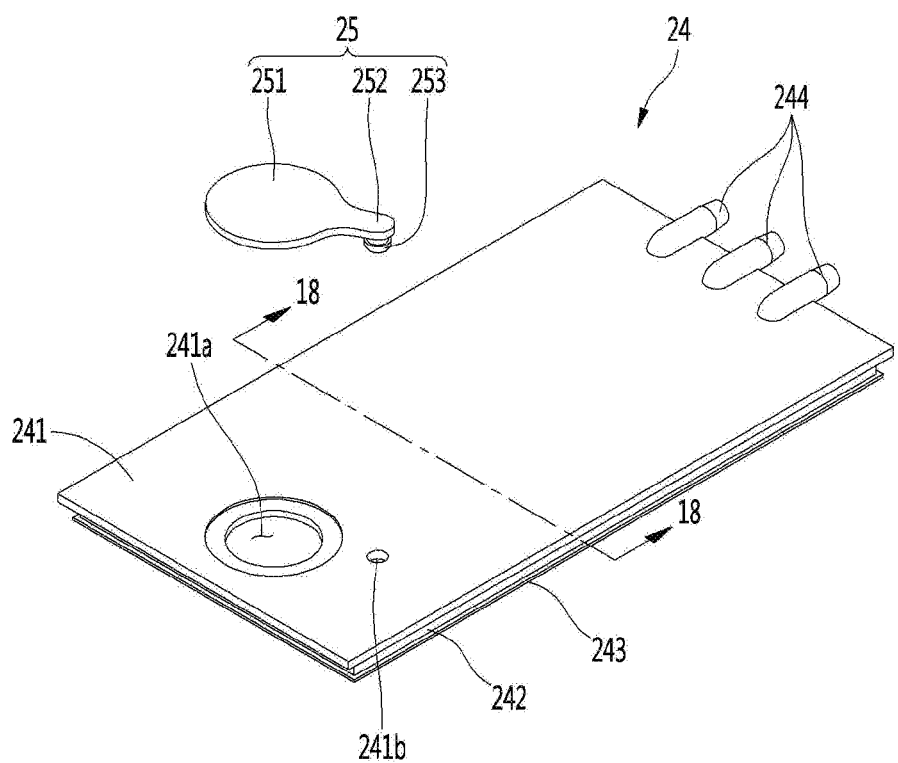
FIG. 17 is an exploded perspective view illustrating a case cover and the injection hole cover constituting the drawer of the steam generating device according to an embodiment of the present invention.
Figure 18:
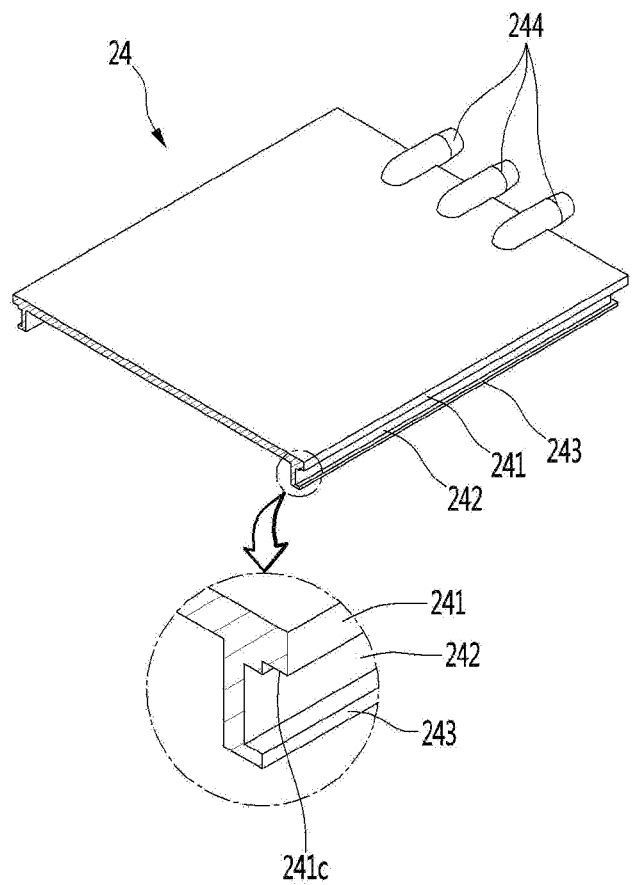
FIG. 18 is a cut away perspective view illustrating the case cover taken along line 18-18 of FIG. 17.

FIG. 17 is an exploded perspective view illustrating a case cover and the injection hole cover constituting the drawer of the steam generating device according to an embodiment of the present invention, and FIG. 18 is a cut away perspective view illustrating the case cover taken along line 18-18 of FIG. 17.

Referring to FIGS. 17 and 18, the drawer 26 of the steam generating device 20 according to the embodiment of the present invention includes a case cover 24 and an injection hole cover 25.

In detail, the case cover 24 completely covers the opened upper surface of the inner case 23 and the opened upper surface of the outer case 22. In addition, an injection hole 241a for water injection is formed at a point near the front end portion of the case cover 24, and the injection hole 241a is selectively shielded by the injection hole cover 25. A fastening hole 241b is formed at a point spaced apart from the edge of the injection hole 241a.

In addition, one or a plurality of discharge ports 244 may be extended at the rear end portion of the case cover 24. The one or a plurality of discharge ports 244 are selectively coupled to the one or a plurality of connection ports 217 formed in the housing 21. For example, when the drawer 26 is separated from the housing 21, the discharge port 244 is also separated from the connection port 217, and when the drawer 26 is inserted into the housing 21, the discharge port 244 also fits into the connection port 217.

The case cover 24 includes a rectangular cover plate 241, an extension portion 242 extending from the lower surface of the cover plate 241, and a pressing flange 234 horizontally bent and extending from a lower end of the extension portion 242.

In detail, the extension portion 242 extends downward from a point spaced apart from the four edges of the cover plate 241 in the center direction. The support surface 241c may be recessed or stepped on the lower surface of the cover plate 241 corresponding to the outside of the extension portion 241.

When the case cover 24 is coupled to the upper surfaces of the inner case 23 and the outer case 22, the upper surface of the outer case 22 is seated on the support surface 241c. In other words, the case cover seating portion 221b of the outer case 22, and the upper end portions of the left side portion 223, the right side portion 224, and the rear portion 225 are in close contact with the support surface 241c.

In addition, the pressing flange 243 presses the upper surface of the flange 236 extending from the upper end portion of the inner case 23, so that the inner space of the inner case 23 is maintained in a sealed state.

On the other hand, the injection cover 25 may be formed of flexible material such as rubber or silicon.

In detail, the injection hole cover 25 may include a cover body 251 that shields the injection hole 241a, an extension end 252 extending from an edge of the cover body 251, and an insertion protrusion 253 protruding from the lower surface of the end portion of the extension end 252. The insertion protrusion 253 is inserted into the fastening hole 241b formed in the case cover 24.

In addition, as illustrated, the edge of the injection hole 241a is formed to be stepped, and correspondingly the lower surface of the cover body 251 may be formed to be stepped in step shape.

Figure 19:
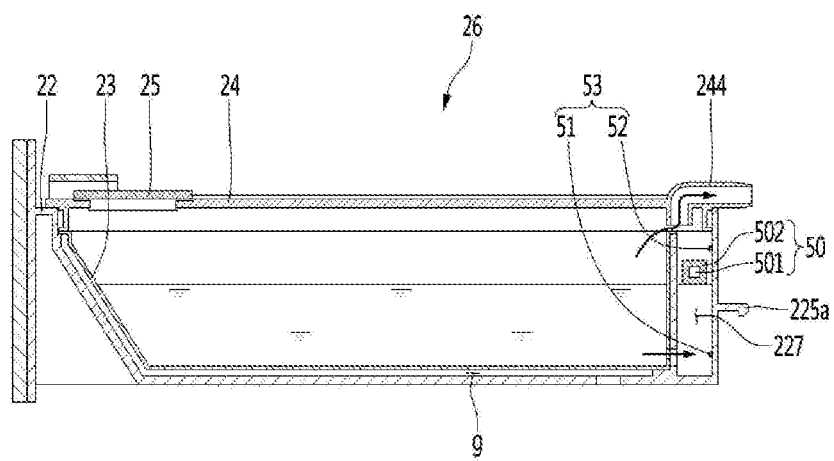
FIG. 19 is a longitudinal sectional view of the drawer taken along line 5-5 of FIG. 2 with the housing removed.

FIG. 19 is a longitudinal sectional view of the drawer taken along line 5-5 of FIG. 2 with the housing removed.

Referring to FIG. 19, an air layer g may be formed between the inner case 23 and the outer case 22 to minimize heat transfer from the inner case 23 to the outer case 22. The inner case 22 is heated by induction heating of the induction unit 30. The water injected through the injection hole 241a is filled in the inner case 23, and a portion of the water filled in the inner case 23 passes through the communication holes 235a and 226a to move to the water level sensing space 227. In addition, the floater 50 is disposed in the water level sensing space 217 and rises by the water filled in the water level sensing space 227.

The floater 50 may include a magnet 501 generating magnetic force, and a floater body 502 encircling the magnet 501. In addition, the water level detecting sensor 53 detects the magnetic force generated in the magnet 501 of the floater 50 to sense the water level inside the inner case 23.

In addition, when power is applied to the induction unit 30, the inner case 23 is heated so that the water stored in the inner case 23 is changed into water vapor. The water vapor generated in the inner case 23 is discharged to the outside of the drawer 26 through the discharge port 241. Finally, the water vapor discharged through the discharge port 241 is supplied into the cooking chamber through the connection port 217 and the steam supply tube 14.

The invention claimed is:

1. A cooking appliance comprising:
   a case that defines a cooking chamber therein;
   a door configured to open and close a front opening of the case;
   a steam generator mounted on an outer surface of the case; and
   a steam supply tube that connects the steam generator to the cooking chamber,
   wherein the steam generator includes:
   a housing fixed to the case, a drawer configured to be withdrawn from and inserted into the housing, the drawer being configured to receive water for generating steam, and an inductor disposed at an inner bottom surface of the housing and configured to heat the water in the drawer by electromagnetic induction, wherein the drawer includes:
an outer case made of a plastic material, the outer case including an engaging hole defined at a bottom thereof, an inner case disposed inside of the outer case and made of a metallic material that is configured to be heated by electromagnetic induction, the inner case including a front portion, a bottom portion, a left side portion, a right side portion, and a rear portion, a case cover that covers upper surfaces of the inner case and the outer case, the case cover having a water injection hole, an injection hole cover coupled to the case cover and configured to open and close the water injection hole, a thermistor disposed below the outer case and configured to sense a surface temperature of the outer case, and an engaging protrusion configured to vertically move to the engaging hole of the outer case based on a temperature value detected by the thermistor, the engaging protrusion having an upper end that is configured to selectively insert into the engaging hole of the outer case to thereby limit withdrawal of the outer case from the housing based on the temperature value detected by the thermistor, wherein the drawer has a separation space that is an air layer defined between the inner case and the outer case, and wherein the engaging protrusion is configured to pass through the engaging hole and protrude upward into the separation ace above the inner bottom surface of the housing.

2. The cooking appliance of claim 1,
wherein the front portion of the outer case includes:
a gripper extending vertically; and
an inclined portion configured to be inclined rearward from a rear surface of the gripper toward a lower side, and
wherein a gripping groove is formed between the gripper and the inclined portion.

3. The cooking appliance of claim 1, wherein the outer case further includes a partition wall that extends upwardly from the bottom of the outer case and that is spaced apart from a rear portion of the outer case, the partition wall being located forward of the rear portion of the outer case,
wherein the outer case has a water level sensing space defined between the rear portion of the outer case and the partition wall, and
wherein each of the partition wall and a rear surface of the inner case has one or a plurality of communication holes that enable water in the inner case to flow into the water level sensing space.

4. The cooking appliance of claim 3, further comprising:
a floater provided in the water level sensing space, the floater having a magnet therein; and
one or plurality of water level detecting sensors provided to any one of walls defining the water level sensing space, wherein the one or plurality of water level detecting sensors include a hall sensor configured to sense magnetic force.

5. The cooking appliance of claim 1,
wherein the engaging protrusion includes a solenoid valve.

6. The cooking appliance of claim 1, further comprising:
an engaging hook protruding from a rear surface of the outer case,
a hook receiver defined at a rear surface of the housing, the engaging hook being configured to selectively engage with the hook receiver; and
a switch provided at the rear surface of the housing and configured to push the rear surface of the outer case.

7. The cooking appliance of claim 6, wherein the switch includes a push-pull switch configured to apply a reaction force that pushes the rear surface of the outer case, and
wherein the engaging hook is configured to couple to the hook receiver based on the outer case being inserted into the housing.

8. The cooking appliance of claim 7, further comprising:
a decor panel configured to be provided on a front surface of the outer case,
wherein a drawer insertion hole into which the drawer is inserted is formed at one side of the decor panel, and
wherein the switch is configured to, based on a force being applied to the front surface of the outer case, apply the reaction force to the rear surface of the outer case such that the front surface of the outer case protrudes from a front surface of the decor panel.

9. The cooking appliance of claim 1, further comprising:
a discharge port defined at a rear end of the injection hole cover; and
a connection port defined at a rear end of the housing and configured to selectively connect the discharge port to an inlet end of the steam supply tube,
wherein an outlet end of the connection port is configured to connect to the inlet end of the steam supply tube.

10. The cooking appliance of claim 1, wherein the inductor includes:
a working coil spirally wound,
a coil bracket supporting the working coil, and
a plurality of magnetic bodies mounted to the coil bracket,
wherein the plurality of magnetic bodies are spaced apart in a circumferential direction of the working coil, and
wherein each of the plurality of magnetic bodies extends by a predetermined length in a radial direction of the working coil.

11. The cooking appliance of claim 1, further comprising a slide rail that extends along each of a left side portion of the outer case and a right side portion of the outer case,
wherein each of a left side of the housing and a right side of the housing comprises a guide jaw and a guide rib that are configured to guide movement of the slide rail.

12. The cooking appliance of claim 1, wherein the separation space is defined between bottom walls of the outer case and the inner case.

13. The cooking appliance of claim 1, wherein the separation space is defined between lateral side walls of the outer case and the inner case.

14. The cooking appliance of claim 13, wherein the separation space is further defined between bottom walls of the outer case and the inner case.

15. The cooking appliance of claim 1, wherein the air layer is filled with air.

16. The cooking appliance of claim 1, wherein the upper end of the engaging protrusion is configured to be received within the separation space above the inner bottom surface of the housing based on the engaging protrusion moving vertically upward to the engaging hole.

17. The cooking appliance of claim 1, wherein the engaging protrusion is disposed at the housing and extends vertically toward the outer case, and
   wherein a lower end of the engaging protrusion protrudes below an outer bottom surface of the housing.

\* \* \* \* \*